Dec. 18, 1956  S. MACHLANSKI  2,774,414
FUEL FLOW EQUALIZER VALVE
Filed April 26, 1950  2 Sheets-Sheet 1
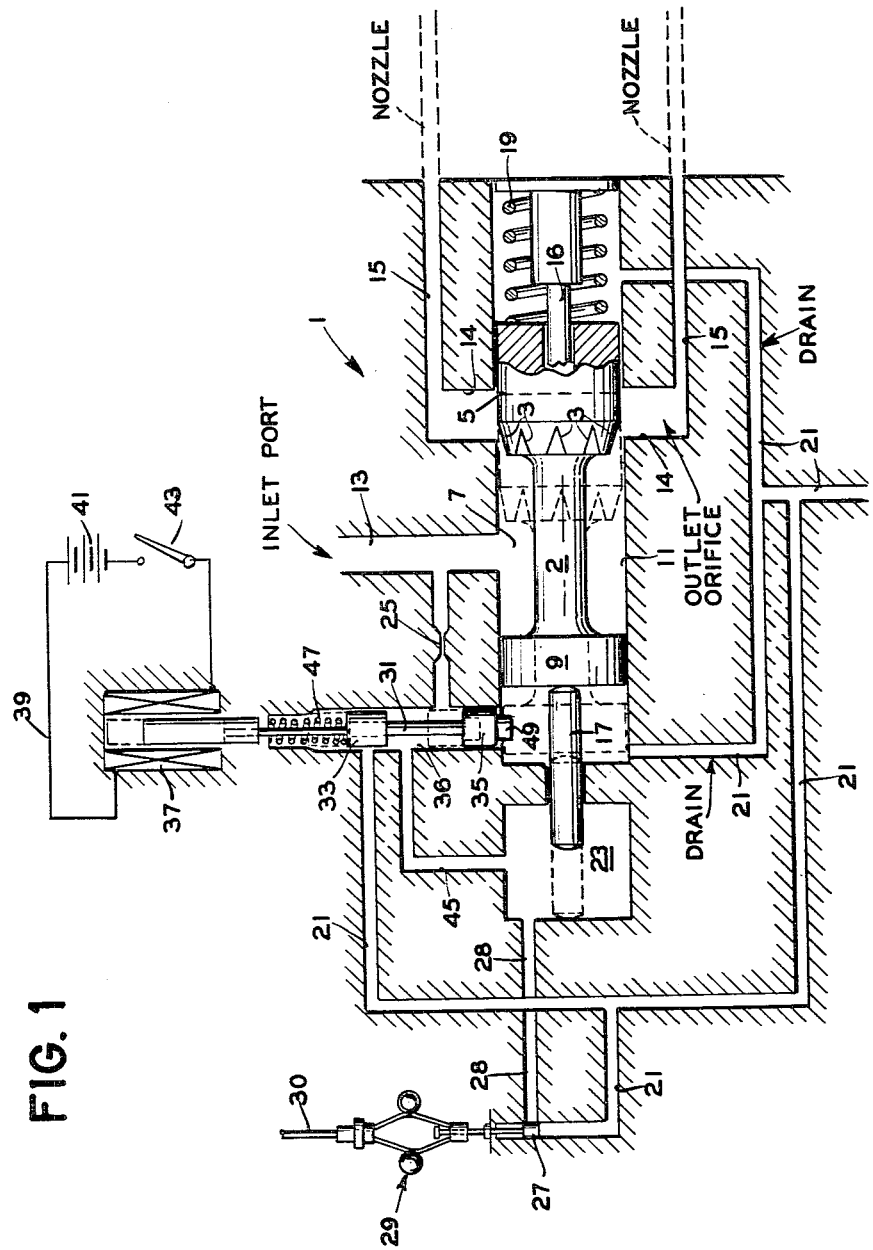
INVENTOR.
SIGMUND MACHLANSKI
BY
ATTORNEY

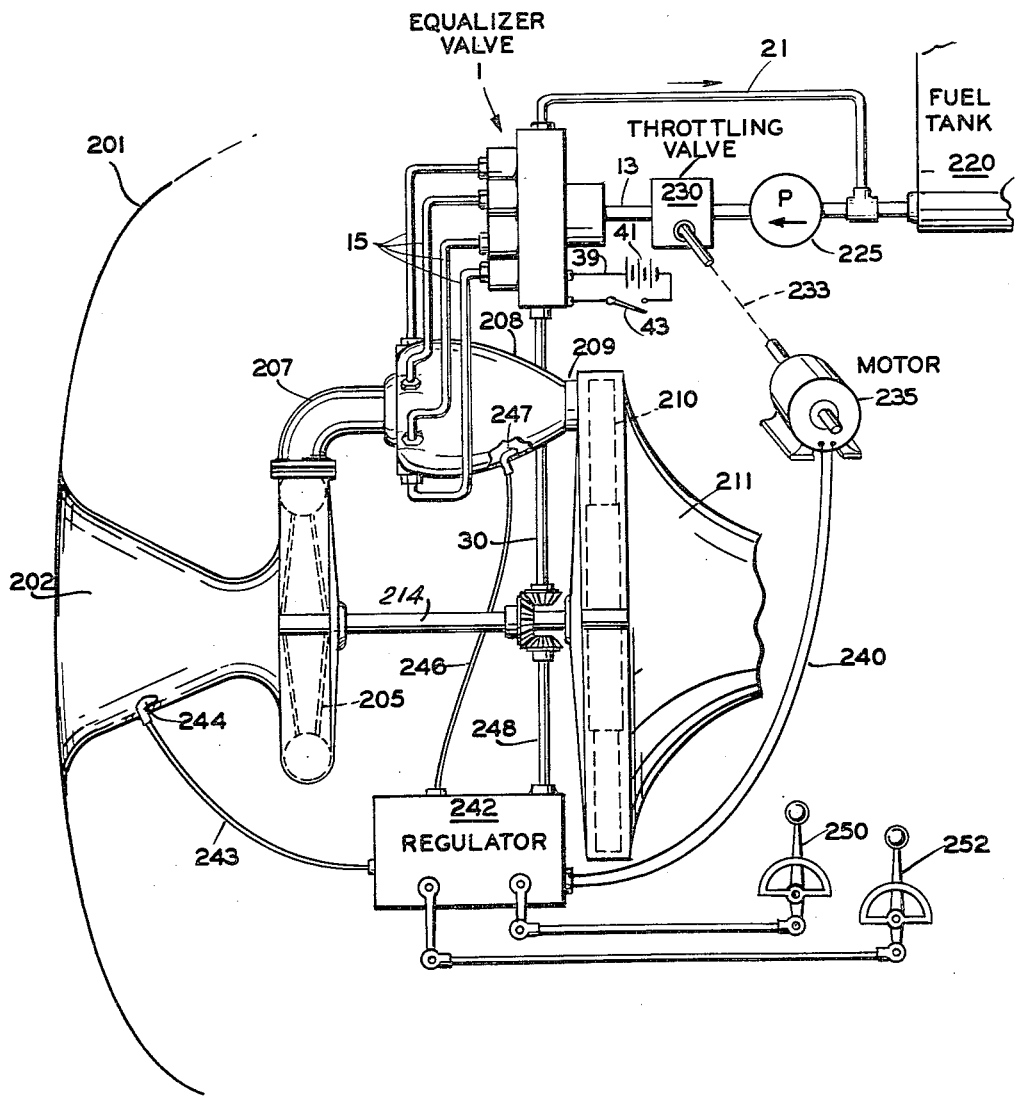

United States Patent Office 2,774,414
Patented Dec. 18, 1956

2,774,414

FUEL FLOW EQUALIZER VALVE

Sigmund Machlanski, Pomona, N. Y., assignor to Bendix Aviation Corporation, Teterboro, N. J., a corporation of Delaware Application April 26, 1950, Serial No. 158,274

3 Claims. (Cl. 158—36)

The present application relates to a novel fuel flow equalizer valve for use in distributing the entire fuel flow equally to a plurality of fuel nozzles of a turbine engine.

An object of the invention is to provide in addition to such a flow equalizer a unit including means for throttling down the fuel flow and for shutting down the engine.

Another object of the invention is to provide a device which divides and equalizes the fuel flow to a plurality of turbine fuel burner nozzles by maintaining a constant pressure drop across a plurality of orifices the size of which is controlled by the fuel pump outlet pressure acting through a restricted passage upon a pin actuating a single piston-like valve having a plurality of equal wedglike orifices each controlling the flow of fuel to an associate fuel conduit leading to a fuel nozzle.

Another object of the invention is to provide a novel fuel distributing valve mechanism including means for stopping the turbine by cutting off fuel flow and permitting drainage of the nozzle lines after shut down by residual compressor pressure causing all fuel in the nozzle lines to blow back to drain so as to prevent dripping and burning of the fuel at the nozzle after the operation of the turbine has been shut down.

Another object of the invention is to provide a novel releasable stop means for preventing such blow back to drain during the throttling down of the fuel flow as upon overspeed control.

The above and other objects and features of the invention will appear more fully hereinafter from a consideration of the following description taken in connection with the accompanying drawings wherein one embodiment of the invention is illustrated by way of example.

Figure 1 is a schematic diagram of the flow equalizer valve mechanism in normal low flow operation.

Figure 2 is a diagrammatic view of an aircraft engine or gas turbine with which the flow equalizer valve is designed for use.

Referring to the drawing of Figure 1, a fuel distributor 1 is regulated by a piston 2 carrying a plurality of wedge-shaped slots 3 of equal size on the inner periphery of a piston land 5.

A chamber 7 enclosed by piston lands 5 and 9 within cylinder 11 is ported to a passage 13 leading from the outlet of a fuel pump for supplying fuel to the fuel nozzles of the turbine engine.

The wedge-shaped slots 3, referred to, open into the chamber 7 so that the fuel pump pressure is at all times present at these points.

During operation at low fuel flow (for example up to 1500 P. P. H.) the regulating piston 2 is positioned so that the individual wedge-shaped slots 3 intercept corresponding outlet ports two of which are indicated here by the numerals 14 leading through passage 15 to associated fuel nozzles. Close regulation is effected by the individual slots 3 being carefully hand stoned to achieve a flow distribution to the several fuel nozzles within one percent of uniformity.

For all flow rates higher than a specified value of, for example, 1500 P. P. H., the regulating piston 2 moves to the extreme right position as limited by a stop 16 so that the several outlet ports 14 are connected directly through the enclosed piston chamber 7 to the fuel inlet 13. In this region uniform fuel distribution is assured by the geometrical similarity of the several nozzle ports which act as fixed orifices.

At low flow the pressure drop across the nozzles is very low so in order to maintain an equal flow of fuel under low flow conditions to all nozzles the subject regulating means is provided. If such means is not provided, unequal line pressure losses or the mere position of the nozzles relative one to the other may cause unequal flows.

Use of the flow equalizer as a throttling device utilizes a hydraulic actuating system which consists of a servo piston-like pin 17 arranged to bias the regulator piston 2 against the force of a compression spring 19 and in which the opposite ends of the piston 2 are balanced by a connection to drain through a passage 21.

A servo pressure chamber 23 is fed from the fuel inlet 13 of the flow equalizer (corresponding to fuel pump outlet) through restriction 25. During normal operation, the pressure in the servo chamber 23 is the same as that of the fuel pump outlet pressure applied to passage 13 and the regulating piston 2 is moved by the piston 17 into the operating region. For emergency throttling, however, a valve 27 controlling passage 28 may open the passage 28 so as to vent the chamber 23 to the drain passage 21.

The valve 27 is arranged for actuation by a suitable speed responsive mechanism 29 driven by shaft 30 from the engine so as to decrease the servo pressure in the chamber 23 and permit the fuel regulating piston 2 to accordingly move toward a fuel cutoff position under force of the spring 19 to regulate the fuel supply to the engine to prevent the engine operating at speeds in excess of a predetermined safe value.

For shutting down the engines there is provided a valve 31 having land portions 33 and 35 defining a chamber 36. The valve 31 is operated by a solenoid 37 controlled by a circuit 39 including a battery or source of electrical energy 41 and a manually operable switch 43.

In normal operation the valve 31 is in the position shown in solid lines in the drawing in which land portion 33 closes drain passage 21 from opening into chamber 36 and a bleed passage 25 leads from the passage 13 through chamber 36 and a passage 45 to chamber 23.

To shut down the engine, the switch 43 may be closed by the pilot to effect energization of the solenoid 37 so as to bias the valve 31 upward against the force of a spring 47, to the position indicated in dotted lines, in which position the land 33 opens servo pressure chamber 23 through passage 45 and chamber 36 to the drain line 21 and the land 35, as further indicated in dotted lines, closes the chamber 36 to the restricted passage 25. The opening of the servo chamber 23 to drain causes the regulating piston 2 to be biased under force of the spring 19 toward the left to cut off the fuel supply. Further, the energization of the solenoid 37 actuates the valve 31 so as to remove the stop portion 49 from the path of the regulator piston 2 so as to permit the piston 2 to move under force of the spring 19 to the end of the cylinder 11 as indicated in dotted lines so as to connect the nozzle lines 15 and the drain line 21 through the cylinder 11. Under these circumstances the nozzle lines 15 are then blown clear of fuel by the back pressure existing in the combustion chamber of the engine. This prevents fuel dripping and burning at the nozzles after the system has been shut down.

The solenoid 37 is arranged so that when deenergized, the solenoid slide valve 31 is positioned by the spring 47 in an operating position in which the inlet pressure supply 13 is connected through the restriction 25 to the servo chamber 23 and the drain connection to the servo chamber 23 is blocked off by the land portion 33. In the latter position of valve 31 servo pressure is applied to the piston pin 17 causing movement of the regulating valve 2 toward the right releasing the stop portion 49 under force of the spring 47 into the position shown in the drawing.

Of course, when the solenoid is energized, the slide valve 31 reverses these connections so that the inlet pressure supply is blocked off by land 35 from the servo chamber 23 while the connection 21 is opened to the chamber 23 through chamber 36.

Referring to Figure 2, there is indicated by numeral 201 an aircraft of a type with which the subject fuel distributor 1 is designed for use. The aircraft has a ram air inlet passage 202 leading to a supercharger 205. An air outlet passage 207 leads from the supercharger 205 to a combustion chamber 208 of conventional type. An exhaust passage 209 leads from the combustion chamber 208 to a turbine 210. The turbine 210 drives through a shaft 214 the blades of the supercharger 205. Conduits 15 are arranged to supply fuel to a plurality of suitable fuel nozzles in the combustion chamber 208 and, as heretofore explained with reference to Figure 1, the lines 15 are regulated by the fuel distributor 1 so as to maintain a substantially uniform flow distribution to the several fuel nozzles.

There is provided a source of fuel 220 supplied under pressure of a pump 225 through a throttling valve 230 to the inlet line 13 of the fuel distributor 1.

The throttling valve 230 may be of conventional type operatively controlled through a shaft 233 by a reversible electric motor 235 connected through an electrical conduit 240 with an electric control system indicated generally by the numeral 242 and which may be of an electro-mechanical type such as disclosed and claimed in the copending U. S. application Serial No. 156,260, filed April 17, 1950 by William E. Brandau, now Patent No. 2,727,356, issued December 20, 1955.

Such control system 242 may be operatively connected through a conduit 243 to a temperature responsive device 244 in the ram air inlet conduit 202, through a conduit 246 to a temperature responsive device 247 in the combustion chamber 208; and may include a device responsive to turbine speed and operatively connected through shaft 248 to the shaft 214 so as to regulate the throttling valve 230 to maintain selected turbine speed and temperature conditions as disclosed in the aforenoted patent. Suitable pilot controls 250 and 252 may be manually operated to select such conditions.

As shown in Figure 2, the shaft 30 is drivingly connected to the turbine driven shaft 214 so as to cause the speed responsive mechanism 31 of Figure 1 to regulate the fuel supply to the combustion chamber 208 and prevent the turbine 210 being driven at a predetermined excessive speed.

Although only one embodiment of the invention has been illustrated and described, various changes in the form and relative arrangements of the parts may be made to suit requirements.

What is claimed is:

1. For use in distributing fuel equally to a plurality of fuel nozzles for a variable speed engine; the combination comprising a fuel flow regulating valve having a plurality of variable size orifices controlled thereby to regulate flow of fuel to each of said nozzles, a spring biasing said regulating valve in a sense to close said orifices to the flow of fuel, input fuel pressure responsive means for biasing said regulating valve in a sense for opening said orifices to the flow of fuel to said nozzles so as to maintain substantially equal flow of fuel to said nozzles, stop means for limiting the movement of the valve in said closing sense, a drain line controlled by said valve, operator-operative means to actuate said stop means to an inoperative position, a control valve for said pressure responsive means, said actuating means operatively connected to said control valve so as to cause the pressure responsive means to permit the spring to effect movement of said regulating valve in a sense to connect said nozzles to the drain line upon the actuation of said stop means to an inoperative position.

2. For use in distributing fuel equally to a plurality of fuel nozzles for a variable speed engine; the combination comprising a fuel flow regulating valve having a plurality of variable size orifices controlled thereby to regulate flow of fuel to each of said nozzles, a spring biasing said regulating valve in a sense to close said orifices to the flow of fuel, input fuel pressure responsive means for biasing said regulating valve in a sense for opening said orifices to the flow of fuel to said nozzles so as to maintain substantially equal flow of fuel to said nozzles, engine speed responsive means, control means for overriding said pressure responsive means, means operatively connecting said speed responsive means to the control means to cause said regulating valve to move under the biasing force of the spring in a sense to close said orifices to the flow of fuel upon the speed of the engine exceeding a predetermined safe value, a second valve for controlling said pressure responsive means, said second valve including stop means for limiting the movement of said regulating valve in said closing sense, a drain line controlled by said regulating valve, operator-operative means to simultaneously actuate said stop means to an inoperative position and said second valve to a position to permit movement of said regulating valve under the biasing force of said spring to a position to connect said nozzles to the drain line.

3. For use with an engine having a combustion chamber, a fuel nozzle in said chamber, and means for supplying a fuel under pressure to said nozzle; the combination comprising a fuel pressure line, a fuel nozzle line, valve means for regulating the flow of fuel from said pressure line to said nozzle line, a drain line controlled by said valve means, operator-operative means to actuate said valve means to close said fuel pressure line to the nozzle line and open said nozzle line to said drain line to permit the nozzle line to be blown clear of fuel by back pressure in the combustion chamber and thereby prevent the fuel in said nozzle line from dripping and burning after termination of operation of the engine in which said valve means includes a slidable valve member, spring means to bias said valve member in a sense to close said fuel pressure line to the nozzle line, and said operator-operative means includes a stop means to limit the movement of said valve member under the biasing force of said spring, and means to release said stop means to permit further movement of said valve member under the biasing force of said spring to open the nozzle line to said drain line to permit fuel in the nozzle line to be blown into the drain line by the pressure in the combustion chamber.

References Cited in the file of this patent

UNITED STATES PATENTS

| | | |
|---|---|---|
| 1,294,151 | Page | Feb. 11, 1919 |
| 2,306,953 | Jung | Dec. 29, 1942 |
| 2,347,238 | Bennett | Apr. 25, 1944 |
| 2,387,364 | Terry | Oct. 23, 1945 |
| 2,405,888 | Holly | Aug. 13, 1946 |
| 2,536,440 | Greenland | Jan. 2, 1951 |

FOREIGN PATENTS

| | | |
|---|---|---|
| 918,129 | France | Jan. 30, 1947 |